United States Patent [19]

Ruckriegel et al.

[11] Patent Number: 4,556,456
[45] Date of Patent: Dec. 3, 1985

[54] MULTI-VAPOR LEVEL VAPOR GENERATING AND RECOVERY APPARATUS

[76] Inventors: Michael J. Ruckriegel, 410 Westwood Dr., Middletown, Ky. 40243; James W. McCord, 9101 Nottingham Parkway, Louisville, Ky. 40222

[21] Appl. No.: 581,543

[22] Filed: Feb. 21, 1984

[51] Int. Cl.$^4$ ............................................. B01D 3/42
[52] U.S. Cl. ................................... 202/186; 202/170; 202/198; 202/199; 202/202; 134/12; 134/31; 134/94; 118/710; 118/719; 203/2; 203/21; 203/98; 203/DIG. 9; 432/210
[58] Field of Search ............... 202/202, 204, 198, 199, 202/170, 161, 185.2, 170 D, 176, 197, 181, 186; 203/39, 40, 41, DIG. 9, 98, 1, 21, 27, 2; 134/11, 12, 31, 94; 432/210; 118/663, 710, 719; 228/102, 103

[56] References Cited

U.S. PATENT DOCUMENTS

| | | |
|---|---|---|
| 2,220,125 | 11/1940 | Seaton .................................... 134/11 |
| 2,310,569 | 2/1943 | Booth ..................................... 134/12 |
| 3,460,990 | 8/1969 | Barday .................................. 134/11 |
| 3,904,102 | 9/1975 | Chu et al. ............................. 202/170 |
| 4,038,155 | 7/1977 | Reber ..................................... 203/39 |
| 4,078,974 | 3/1978 | McCord ................................ 202/170 |
| 4,090,843 | 5/1978 | Chu et al. ............................. 432/210 |

Primary Examiner—Wilbur Bascomb
Attorney, Agent, or Firm—Charles G. Lamb

[57] ABSTRACT

An apparatus for generating at least two vapor zones, one above the other, by vaporizing a fluid mixture having at least two compounds therein having different vaporizing temperatures. The apparatus includes a chamber with vaporizing means, and vapor condensing means. Condensate recovery means is provided for recovering the condensed vapor and the condensate recovery means is in flow communication with a separation device for receiving the condensate from the condensate recovery means. The flow communication between the condensate recovery means and the separation device is external of the chamber. The separation means revaporizes the liquid with the lower vaporizing temperature for return to the vapor zone in the upper portion of the chamber and separates as a liquid the fluid having a higher vaporizing temperature.

11 Claims, 2 Drawing Figures

MULTI-VAPOR LEVEL VAPOR GENERATING AND RECOVERY APPARATUS

BACKGROUND OF THE INVENTION

1. Field of the Invention

This invention relates, generally, to vapor generating and recovery apparatus wherein a liquid is vaporized and recovered by condensation. More particularly, the present invention is directed to a vapor generating and recovery apparatus for vaporizing at least two components of a fluid mixture, generating at least two vapor zones, and separately condensing the vapor of each zone.

2. Description of the Prior Art

In surface treating of objects, hot vapors have been used to heat the surface of the objects, coat the surface of the objects with coating material in the vapor, and clean the surface of the objects.

Known apparatus typically are open topped vessels providing for the placing of objects into a treating vapor contained in the vessel. In some devices it is known to generate two vapor zones, one overlaying the other. In order to prevent significant loss of the top or second vapor, and any trace of the lower or first vapor which may be entrained in the second vapor, the second vapor is continuously condensed and re-vaporized. Further, in order to maintain a first vapor zone for the higher vaporizing component of a fluid mixture, the vapor is also continuously condensed and re-vaporized.

One such known apparatus is shown in U.S. Pat. Nos. 4,055,217 and 4,090,843 issued to Tze Yav Chu and George Michael Wenger.

SUMMARY OF THE INVENTION

It is an object of the present invention to provide an apparatus for generating at least two vapor zones one above the other, and recovering the vapor of each zone by condensation.

It is a further object of the present invention to provide an apparatus of the class described wherein a first vapor is caused to condense and the second condensate is caused to vaporize by the same device.

It is another further object of the present invention to provide an apparatus of the class described which is energy efficient.

It is even a further object of the present invention to provide an apparatus of the class described which enables means to condense vapors in a vapor generating device disposed in two vapor zones with only one externally supplied cooling means.

The present invention provides an apparatus for vaporizing a fluid mixture containing at least a first liquid and a second liquid having different vaporizing temperatures comprising a housing defining at least one another open to the atmosphere for containing the chemical composition in its liquid and vapor form, heating means located proximate the lower region of the housing for vaporizing the fluid mixture thereby providing a first vapor zone and a second vapor zone overlaying the first vapor zone; vapor condensing means operating at a temperature less than the vaporizing temperature of the second liquid, said vapor condensing means being located at least partially below the upper surface of the second vapor zone; condensate collection means located to collect condensate condensed by the vapor condensing means; separation means located disposed for separating first liquid condensate from the second liquid condensate which may have be been condensed with the second liquid condensate by the condensing means, the separation means being in vapor flow communication with the portion of the chamber containing the second vapor zone and liquid flow communication with the portion of the chamber containing the first vapor zone; and, means for providing liquid communication from the condensate collection means to the separation still externally of the first and second vapor zones.

BRIEF DESCRIPTION OF THE DRAWINGS

A better understanding of the present invention will be had upon reference to the following discussion in conjunction with the accompanying drawings wherein.

DETAILED DESCRIPTION

Figure 1:
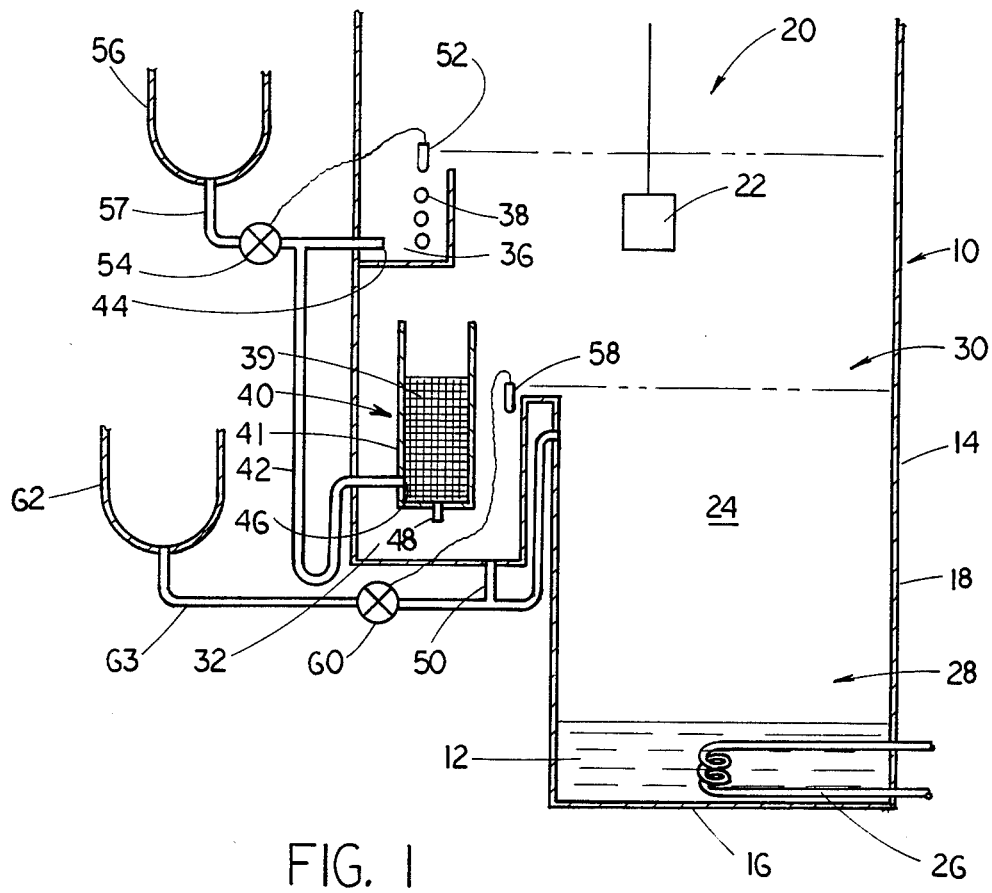
FIG. 1 is a diagrammatic representation, in cross-section, of an elevational view of an apparatus embodying the present invention; and, FIG. 2 is an enlarged perspective representation of a portion of the apparatus of FIG. 1 with selected portions cut-away.

With reference to FIG. 1, there is shown, in diagrammatic form, an apparatus 10 for vaporizing and recovering a fluid mixture 12 of at least a first liquid and a second liquid having different vaporizing temperatures. The apparatus 10 includes a housing 14 having a floor 16 and side wall 18 extending upwardly from the floor 16. The upper peripheral edge of the wall 18 defines an open top 20 of the housing through which objects 22 to be treated are inserted into and removed from chamber 24 defined by the housing 14.

Heating means 26 is located proximate the lower region of the housing 14 above the floor 16 for vaporizing the chemical composition 12 contained in the housing 14 thereby generating a first vapor zone 28 of the fluid liquid component of the composition 12 and a second vapor zone 30 of the second liquid component of the composition 12 overlaying the first vapor zone 28. The heating means 26 can be a heat emitting coil such as, for example, an electrically heated coil, heating plates, water heated coil or refrigerant condenser coils of a refrigerant system.

The housing 14 includes first condensate collection means 32 illustrated as a trough open to the chamber 24 proximate the top surface of the first vapor zone 28. The first condensate collection means 32 will be discussed further.

The housing 14 also includes second condensate collection means 36 illustrated as a trough open to the chamber 24 proximate the top surface of the second vapor zone 90. Vapor condensing means 38, such as a coil, is located within the second condensate collection trough 36. The coil 38 can be of virtually any type of cooling coil such as, for example, a water cooled coil or refrigerant evaporator coil of a refrigerant system. The vapor condensing coil 38 operates at a temperature below the vaporizing temperature of the second liquid component of the mixture 12. As shown, the vapor condensing coil 38 is at least partially below the upper surface of the second vapor zone 30.

Figure 2:
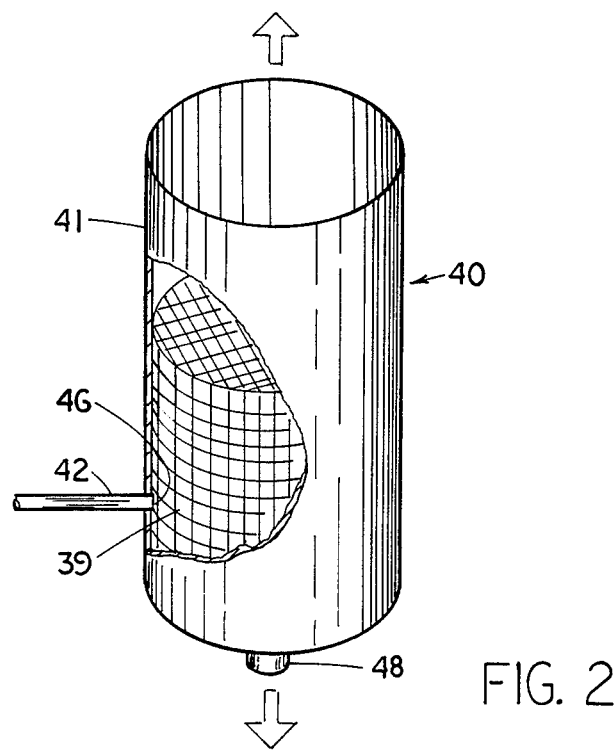

With continued reference to FIG. 1 and additional reference to FIG. 2, the apparatus 10 also includes a liquid-vapor separation device 40. The separation device 40 includes liquid-vapor separation means 39 constructed to provide a large surface area contained within a vertically extending tubular member 41. The tubular member 41 is open at its upper end to provide vapor flow communication with the second vapor zone 30 as indicated by the vapor flow arrow in FIG. 2. Toward this end, the separation means 39 can be constructed of, for example, spaced apart plates, interwoven wire strands or mesh, as illustrated, and the like. The particular construction and overall shape of the separation device 40 and the separation means 39 is not particularly critical as long as the construction provides a large surface area for liquid-vapor contact. The separation device 40 is shown as being located in or adjacent to the first condensate collection trough 32 so that it is in vapor flow communication with the portion of the chamber 24 containing the second vapor zone 30, and in liquid flow communication with the first condensate collection trough 32. The separation device 40 functions to separate any trace of first condensate from the second condensate which may have been co-mingled with and, therefore, condensed with the second vapor by the condensing means 38 and collected in the second condensate collection means 36. Furthermore, by the high surface area available for liquid-vapor contact, the first liquid having the higher vaporizing temperature, as it cools, provides the latent heat for vaporization of the second liquid condensate.

The separation device 40 is in liquid flow communication with the second condensate collection trough 36 by means of, for example, a conduit 42 having an inlet end 44 in the second condensate collection trough 36 and an outlet end 46 in the separation device 40. Thus second condensate and any traces of first condensate co-mingled therewith, condensed by the condensing means 38 and collected in the second condensate collection trough 36 is routed to and deposited in the separation device 40 wherein it is dispersed over a large surface area provided by the separation means 39. The separation device 40 is illustrated as being in liquid flow communication with the first condensate collection means 32 by means of a conduit section 48 although it is contemplated the first condensate could merely run off the surface of the separation device 40 into the first condensate collection means 32.

With reference to FIG. 1, the first condensate collection trough 32 is in liquid flow communication with the chamber 24 above the composite mixture 12 for returning primary condensate back to the chamber 24 for re-vaporization. This liquid flow communication can be established by means of, for example, a conduit 50 having its inlet end in the first condensate trough 32 and outlet end in the chamber 24 in the first vapor zone 28.

Make-up means for both the first and second liquids are also provided. A first liquid make-up tank 62 is disposed in fluid communication through conduit 63 with the conduit 50 which is in fluid communication with the first vapor zone 28. A control valve 60 in conduit 63 is provided for controlling the flow of liquid from tank 62. The control valve 60 is activated in response to condition sensing device 58 disposed substantially at the upper level of vapor zone 28. Condition sensing device 58 may be a pressure or temperature sensing device set for sensing a condition when the vapor zone operates outside preselected pressure or temperature conditions which determine that more first liquid is needed.

A second make-up tank 56 is disposed in fluid communication through conduit 57 with the conduit 42 which is in fluid communication with the separation device 40. A control valve 54 in conduit 57 is provided for controlling the flow of liquid from tank 56. The control valve is activated in response to condition sensing device 52 disposed at the upper level of vapor zone 30. Condition sensing device 52 is substantially the same as condition sensing device 58, but set to monitor preselected conditions in the second vapor zone 30.

In operation, the fluid mixture 12 is heated to a temperature above the vaporizing temperature of the first liquid component by the heating means 26 which provides sufficient heat to vaporize the second liquid component. The second liquid component will vaporize initially to establish the second vapor zone 30, and the first liquid component will thereafter vaporize to establish the first vapor zone 28 beneath the second vapor zone 30. Objects 22 to be treated are immersed in the first vapor zone 28. The first vapor condenses on the objects 22 and drains back into the mixture 12 whereat it is revaporized. The second vapor in the second vapor zone 30, and any traces of first vapor entrained in the second vapor zone 30, is condensed by the second condensing means 38 and drains into the second condensate collection trough 36. The condensate collected in the collection trough 36 passes through the conduit 42 and is discharged into the separation device 40. The condensate is dispersed throughout the extended surface of the separation member 39. The second condensate in the separation device is vaporized by the hot first liquids and vapors in the separation means 39 and the first condensate collection trough 32 which may have flowed into the trough 32 from the first vapor zone 28. The second vapor flows from the separation device 40 into the second vapor zone 30 to replenish the second vapor condensed by the condensing coil 38. Concurrently, any traces of first vapor entrained with the second vapor in the separation device 40 is caused to condense therein by the removal of heat due to the vaporization of the second fluid. The first condensate drains from the separation device 40 through, for example, the conduit section 48 into the first condensate collection trough 32. The collected first condensate in the first condensate collection trough 32 is recycled back to the chamber 24, for vaporization replenishing the first vapor in zone 28, by means of, for example, the conduit 50. In addition, any first vapor which may flow into the first condensate collection trough 36 from the first vapor zone 28 is also condensed by the second fluid being vaporized and is recycled back to the chamber 24 through the conduit 50 wherein it is vaporized to replenish the first vapor in zone 28.

The foregoing detailed description is given mainly for clearness of understanding and no unnecessary limitations are to be understood thereby for modifications will become obvious to those skilled in the art upon reading this disclosure and may be made without departing from the spirit of the invention or scope of the appended claims.

What is claimed is:

1. An apparatus for vaporizing and recovering a fluid mixture containing at least a first liquid and a second liquid having different vaporizing temperatures, comprising:
   a housing defining at least one chamber open to the atmosphere for containing the fluid mixture in its liquid and vapor form;
   heating means located proximate the lower region of the housing for vaporizing the fluid mixture thereby providing a first vapor zone and a second vapor zone overlaying the first vapor zone;

vapor condensing menas operating at a temperature less than the vaporizing temperature of the second liquid, said vapor condensing means being located at least partially below the upper surface of the second vapor zone;

condensate collection means located to collect condensate condensed by the vapor condensing means;

a separation device for separating first liquid condensed with the second liquid by the condensing means;

means for providing liquid condensate flow communication from the condensing means to the separation device externally of the first and second vapor zones;

vapor flow communication means providing for vapor flow communication with the portion of the chamber containing the first vapor zone and the portion of the chamber containing the second vapor zone such that the first vapor from the first vapor zone will pass to the separator device through said vapor flow communication means to transfer latent heat to the liquid condensate in the separator device thereby simultaneously vaporizing the second liquid component of the liquid condensate and condensing the first vapor, whereupon the second vapor returns to the second vapor zone through said vapor communication means; and, liquid flow communication means providing liquid flow from said separator device to the portion of the chamber containing the first vapor for returning the first vapor condensate from the separator device to the chamber.

2. The apparatus of claim 1, wherein the condensate collection means comprises trough means open to the housing chamber proximate the upper surface of the second vapor zone.

3. The apparatus of claim 2, wherein the vapor condensing means is located at least partially within the condensate collection trough means.

4. The apparatus of claim 1, wherein the separation device includes an elongated vertically extending column with a relatively high surface area over which the liquid received from the condensate collection means is distributed.

5. The apparatus of claim 4, wherein the said column is a tubular member open at its upper end to said second vapor zone and open at its lower end to said first vapor zone, and having means providing for liquid flow communication from the open lower end of the tubular member to the portion of the chamber containing the first vapor, said tubular member being provided with high surface area material therein.

6. The apparatus of claim 5 wherein the means to provide liquid flow communication with the portion of the chamber containing the first vapor includes trough means open to and disposed beneath the lower end of said tubular member and a conduit member in flow-through communication at one end with said trough means and in flow-through communication at its other end with said chamber.

7. The apparatus of claim 1, further comprising means providing for make-up of said first liquid to the portion of the chamber containing the first vapor.

8. The apparatus of claim 7, wherein said means providing for make-up of said first liquid includes a make-up tank, liquid flow communication means for establishing liquid flow communication between said make-up tank and said first vapor zone, control valve means disposed in the liquid flow communication means for controlling the flow of liquid from said make-up tank to said first vapor zone, said control means including condition sensing means disposed within the first vapor zone for actuating the control valve means in response to preselected conditions within the first vapor zone.

9. The apparatus of claim 1 further comprising means providing for make-up of said liquid to said condensate collection means.

10. The apparatus of claim 9 wherein said means providing for make-up of said second liquid includes a make-up tank, liquid flow communication means for establishing liquid flow communication between said make-up tank and said second vapor zone, control valve means disposed in the liquid flow communication means for controlling the flow of liquid from said make-up tank to said second vapor zone, said control valve means including condition sensing means disposed within the second vapor zone for actuating the control valve means in response to preselected conditions within the second vapor zone.

11. The apparatus of claim 9, wherein said means providing for liquid flow communication of said second liquid from the make-up tank to said condensing collection means further includes means providing for liquid flow communication of said second liquid from said make-up tank with said separation means.

* * * * *